(12) United States Patent
Wirth (10) Patent No.: US 6,494,301 B1
(45) Date of Patent: Dec. 17, 2002

(54) ELASTIC BRAKING BODY

(75) Inventor: Xaver Wirth, Ismaning (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/786,271

(22) PCT Filed: Aug. 26, 1999

(86) PCT No.: PCT/EP99/06261

§ 371 (c)(1), (2), (4) Date: Jun. 8, 2001

(87) PCT Pub. No.: WO00/14422

PCT Pub. Date: Mar. 16, 2000

(30) Foreign Application Priority Data

Sep. 3, 1998 (DE) .......................................... 198 40 065

(51) Int. Cl.$^7$ .............................................. F16D 69/00
(52) U.S. Cl. ............................. 188/259; 188/33; 188/35
(58) Field of Search ........................... 188/259, 33, 35, 188/41, 247, 235, 240, 58, 59, 249, 72.2, 73.1, 73.2, 72.3, 250 B, 73.37, 250 G, 73.41, 83, 214, 215, 220.6, 220.1, 221.1, 231, 234, 238, 239

(56) References Cited

U.S. PATENT DOCUMENTS

| | | | |
|---|---|---|---|
| 1,239,447 A | 9/1917 | Armbrust | |
| 2,268,280 A | 12/1941 | DeFrance | |
| 3,473,631 A | 10/1969 | Schmid | |
| 4,501,347 A | 2/1985 | Cerny et al. | |
| 5,934,418 A | 8/1999 | Wirth | |

FOREIGN PATENT DOCUMENTS

| | | |
|---|---|---|
| DE | 277907 | 12/1912 |
| DE | 118284 | 12/1926 |
| DE | G 93 07 017.9 | 8/1993 |
| DE | 43 01 006 A1 | 7/1994 |
| DE | 295 00 977.2 | 4/1995 |
| DE | 44 36 457 A1 | 4/1996 |
| FR | 1.064.633 | 5/1954 |
| FR | 2 689 195 | 10/1993 |
| FR | 2 734 875 | 12/1995 |
| FR | 2 733 290 | 10/1996 |
| GB | 1089955 | 11/1967 |

OTHER PUBLICATIONS

Bremsen Für Schienenfahrzeuge, Handbuch, Bremstechnische Begriffe und Werte, Knorr–Bremse AG München 1976, pp. 22, 23, 41, 50.

Primary Examiner—Pam Rodriguez
(74) Attorney, Agent, or Firm—Barnes & Thornburg (57) ABSTRACT

The invention relates to a braking body for a rail car, especially a brake block or disk brake pad, comprising a supporting body with recesses and friction material elements arranged in the recesses. The friction material elements form a friction surface with the supporting body and are mounted with elastic or tilting elements such that the frictional material elements can move in the longitudinal direction of the recesses and adapt themselves to the running surface of a rail wheel.

14 Claims, 7 Drawing Sheets

ELASTIC BRAKING BODY

BACKGROUND AND SUMMARY OF THE INVENTION

The invention relates to a braking body, which is constructed as a brake block or a disk brake pad, comprising a supporting body with recesses as well as friction material elements arranged in the recesses.

Two large classes of friction brakes exist particularly in the case of rail vehicles. These are, on the one hand, the so-called block brakes and, on the other hand, the disk brakes.

The block brake is a friction brake for rail vehicles which can be constructed at reasonable cost. In the case of such a braking device, only an application device is required to press the brake block onto the running surface of the rail wheel. With respect to the construction of block brakes, reference is made to "Brakes for Rail Vehicles, Manual—Brake-Related Terms and Values", Knorr Bremse AG München, 1990, Pages 22 to 23 as well as Page 41.

A disadvantage of the block brake according to the prior art is particularly the high stressing of the wheel running surface which shortens the service life of the wheel, as well as roughening of the wheel running surface and rail corrugation. Particularly the latter effects result in a high running noise during the rolling operation of the wheel. These disadvantages of the block brake have promoted the development and the use of the disk brake in modern passenger train cars.

In the case of a disk brake, brake disks are mounted on both sides of the wheel body. The brake pads act upon the brake disk. The pertaining wheel is braked because of the friction force.

Concerning the construction of disk brakes according to the prior art, reference is made to "Brakes for Rail Vehicles, Manual—Brake-Related Terms and Values", Knorr-Bremse AG München, Page 50.

Brake blocks with recesses have become known from a plurality of publications. Thus German Patent Document DE-C-277907 shows a brake block with recesses into which a felt material is introduced. The felt material projects beyond the supporting body, so that no common friction surface is formed with the supporting body.

The brake block known from German Patent Document DE-U-29500977 comprises bores which receive stoppers made of friction material. However, these are fastened on the supporting body only by a screw. An elastic or tilting mounting of the individual friction material blocks has not become known from German Patent Document DE-U-29500977.

From French Patent Document FR-A-2689195 and British Patent Document GB-A1089955, individual braking bodies, which have a recess and a friction material element movably arranged therein, have become known. However these represent no brake blocks on brake pads with several recesses.

The brake pads known from German Patent Documents DE-A-4301006, DE-A-4436457 and DE-U-9307017 comprise elastically or tiltingly disposed friction material blocks. However, these are arranged directly on the supporting body and form, particularly with the supporting body, no cohesive friction material surface.

In the case of block brakes as well as in the case of disk brakes, a general problem is the contact pressure between braking bodies; that is, the brake block and the wheel, as well as the brake pad and the brake disk.

Because of heat conditions of either the braking body the wheel or the disk as well as their wear, the actual braking power of the above-mentioned friction brakes is always significantly lower than the theoretically possible braking power according to the material constants.

In the case of block brakes, an additional factor in optimizing braking power is that, for running-related reasons, the wheel running surface forms a surface which cannot be developed. The brake block therefore often rests only on points on the wheel running surface and forms a line-shaped contact. Because of this contact, the block brake is considerably overstressed.

Another problem of the above-described brake systems is the contact pattern which is insufficient, for example, because of thermal expansions and axial displacements. Generally, the harder the material the poorer the contact patern. The poor contact pattern results in rail corrugation or cracking in the wheel running surfaces and, as a result, in a high noise development during the braking.

It is therefore an object of the invention to provide a braking body, particularly for block brakes or disk brakes by which the above-mentioned disadvantages can be overcome.

According to the invention, this is achieved in that the friction material elements are movably disposed in the longitudinal direction of the recesses in a supporting body. The friction material elements are mounted in the recesses with the mounting elastic elements in the direction of the recesses with the mounting elastic elements in the direction of the recesses or tilting, elements. The friction material elements can form friction material blocks which can form a friction surface with the supporting body.

As a result of the movably disposed friction material elements, the surface pressure of the braking body according to the invention is improved decisively.

Another advantage of the brake block of the present invention is the fact that, when the wear of the wheel is uneven or in the case of an axial displacement, the individual friction material elements blocks can shift the recesses and therefore adapt themselves to the running surface of the wheel. Despite this displacement, the elastic or tilting suspension ensures essentially always the same surface pressure. In particular, always the same surface pressure is ensured independently of the axial position or wear.

In different embodiments of the invention, the recesses are arranged with the friction material elements either in series or offset with respect to one another.

A preferred embodiment of the invention is one in which the friction surface of the friction material elements constitutes a percentage of at least 30%, preferably 50 to 80%, of the entire friction surface of the braking body.

The elastic mounting of the friction material elements by elastically deformable bodies, such as spring elements, offers a number of additional advantages during different braking operations, described herein.

If a constant braking occurs with a high application force, the elastically disposed friction material elements, after a sufficiently long braking time, will compress so far that the sum of the elastic forces corresponds approximately to the application force of the brake block or of the brake pad.

After the occurrence of a contact pattern change, for example, by the axial displacement of the wheel or by a thermal bulging, a compression or rebounding of the elastically disposed friction material elements will take place corresponding to their characteristic spring curve, while each wheel bulge wears out the supporting body more than the adjacent friction material element. The valley on the wheel surface situated between two bulges relieves the contact area of the supporting body, while the friction material elements move out in a spring-loaded manner and ensure a certain friction energy feed therefore also in the valley area. This counteracts the formation of so-called hot spots in the case of block brakes but also in the case of disk brakes.

During constant braking with a lower surface pressure, after the release of the brake, a condition of the braking body will occur in which the friction material elements protrude with respect to the supporting bodies because the elastic elements, such as spring elements, relax.

If, starting from this condition, a slight braking takes place, the friction material elements are pressed into the recess only slightly and remain protruding with respect to the friction surface of the supporting body. Only a long or frequent braking by means of a low contact pressure force will have the result that the friction material elements will abrade and form a friction surface in a surface-flush manner with the supporting body.

During brief brake applications, two alternatives are conceivable.

In a first alternative, the friction material elements protrude at the start of the braking. Also in this case, a relatively uniform surface pressure occurs and thus a uniform introduction of energy into the wheel and the brake disk, which is defined by the elastically embedded friction material elements.

As an alternative thereto, before the start of the braking, the surface of the supporting body and of the friction material elements can close off almost flush. In such a case, the supporting body acts like a soft brake pad which, as a result of its elasticity, adapts itself to the wheel topography. The friction material elements elastically arranged in the recesses act in the same manner.

Spring elements are used as elastic elements. Specifically, the spring elements can be for instance, cup springs, flat coil springs, rubber rings or small rubber plates.

As an alternative to the elastic elements, the same effects can be achieved when the movable mounting of the friction material blocks comprises tilting elements which permit a movement of the friction material elements in the direction of the longitudinal axis of the recess because of tilting movements of the tilting elements.

In a further embodiment, several tilting elements can be arranged above one another, which mutually couple and thus form a superset tilting element.

In order to reduce the friction between the individual friction material elements and the recesses in the supporting body, it is advantageously provided that, between the interior wall of the recess and the friction material elements, devices are provided for reducing friction. Such sleeves may be made of sheet metal, which are fitted into the recess, and are particularly useful for this purpose.

The above-described preferred embodiments of the invention are achieved when the supporting body consists of a softer and more wear-prone material than the individual friction material elements.

In contrast, the friction material elements are preferably constructed of a temperature-stable, hard, wear-resistant material with a high modulus of elasticity in order to be able to achieve high brake performances. In particular, reference is made here to the use of quartz-bound high-temperature friction materials or sintered materials which are produced from superfine metal powder which comprises, for example, iron, copper and nonferrous metals.

In a further development of the invention, the friction material elements situated in a recess are combined to an individual friction material block which may have a circular-cylindrical shape. In this context, friction material blocks with, for example, nine individual elements can be arranged in a matrix and can be connected with one another, for example, by an adhesive substance or an equivalent.

The cylindrical friction material element can preferably be received in a recess in the supporting body constructed as a circular bore.

In addition to a circular-cylindrical shape of the friction material elements and of the recesses, other shapes can also be used, for example, with an n-cornered or elliptical cross-section of the individual friction material elements.

In the case of more expansive friction material elements or friction material blocks, a mat, for example, made of a caoutchouc-elastic material is advantageously used as the elastic layer instead of individual spring elements.

In one embodiment, the braking body according to the invention is provided as a brake block in conventional block brake units. For such an application, it is advantageous for the linking of the braking body according to the invention to the brake block shoe or the operating device to take place in a conventional manner according to the UIC Standard.

As another embodiment, the braking body can be used in a disk brake. Here also results similar to those with respect to the use of block brakes are achieved. In particular, when using hard, wear-resistant materials, a good contact pattern is achieved in many different operating situations, particularly because the pad surface adapts to the uneven friction surface of the brake disk so that the formation of hot spots is prevented. In addition, a high muffling of noises is achieved because of the elastic mounting.

DETAILED DESCRIPTION OF THE PREFERRED EMBODIMENTS

Generally, the elastic braking body invention is comprised of a braking body, which is constructed as a brake block or a disk brake pad. The braking body comprises a supporting body with recesses and friction material elements arranged in the recesses. In accordance with the principles of the current invention when the brakes to a rail car are applied, the braking body's friction material elements are such that they can shift and adapt themselves to the running surface of the rail wheel and thereby ensure essentially constant surface pressure on the wheel. That is possible because the friction material elements are mounted in the recesses with elastic or tilting elements that enable the friction material elements to be movably disposed which therefore ensures essentially the same surface pressure independent of the axial position or wear of the wheel. Different embodiments of the braking body have the recesses existing in various possible combinations and shapes as well as being arranged in series or offset with one another. The embodiments also have the possibility of different types of elastic and tilting elements as well as other attributes applicable to the embodiments as herein described.

Figure 1A:
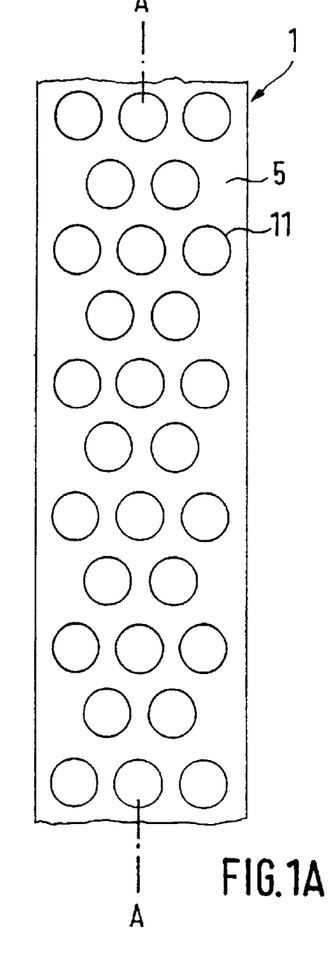
FIG. 1A is a top view of the friction surface of an embodiment of braking body brake block according to the invention.

In a top view, in the embodiment shown in FIG. 1A. The entire friction surface 1 is composed of the friction surface 5 of the supporting body 7 as well as the friction material elements 9 which are preferably elastically mounted in recesses 11 of the supporting body 7. In the illustrated embodiment, the recesses 11 in the supporting body 7 have a circular cross-section and are preferably blind holes or pocket holes made in the supporting body 7. The percentage of the friction surface of the friction material elements 9 is at least 30%, preferably between 50 and 80% of the entire friction surface 1 of the braking body 3. In the embodiment illustrated in FIG. 1A, the recesses 11 for the friction material elements 9 are arranged in an offset manner. As an alternative, the recesses 11 can be arranged in series (not shown). A particularly good contact pattern of the braking body 3 according to the invention is achieved when the supporting body 7 consists of a softer material than the friction material elements 9.

Figure 1B:
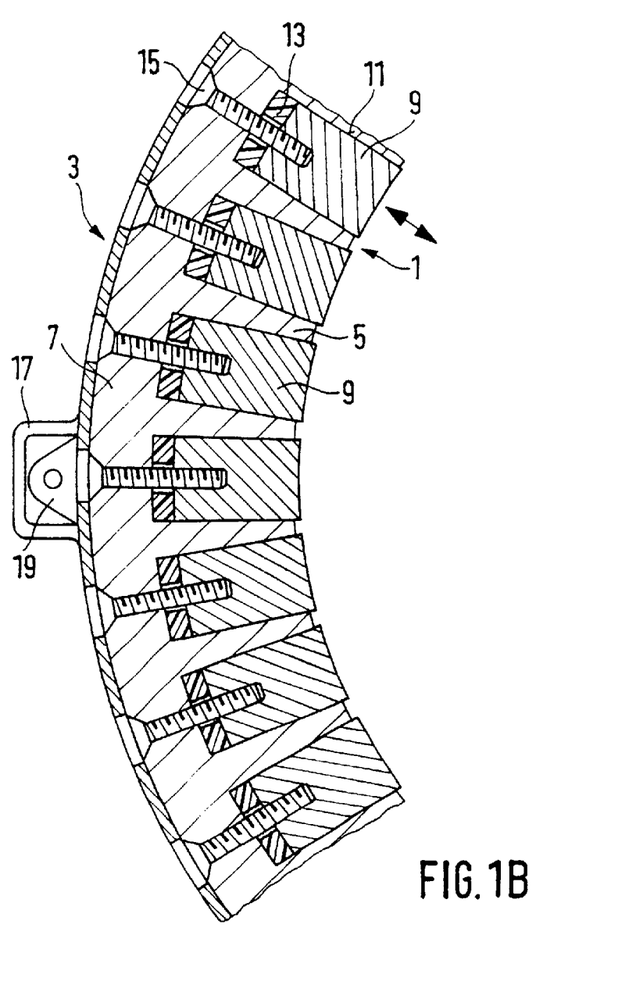
FIG. 1B is a cross-sectional view along Line A—A of the braking body illustrated in FIG. 1A.

FIG. 1B illustrates an embodiment where the supporting body 7, has recesses 11 that are provided which, in the present case, are constructed as cylindrical pocket holes perpendicular to the entire friction surface 1 of the braking body 3. Friction material elements 9 are situated in the recesses 11 and also have a cylindrical shape. The friction material elements 9 preferably consist of a hard wear-resistant friction material, for example, a sintered material. On the base of each recess 11 of the supporting body 7, an elastic element 13 is arranged, through which a fastening device 15 reaches. The fastening device 15, in turn, is connected with the cylindrical friction material element 9, ensuring that the latter cannot be lost. The supporting body 7 has essentially the shape of a conventional brake block, as disclosed, for example, in "Brakes for Rail Vehicles, Manual—Brake-Related Terms and Values", Knorr Bremse AG München. On the supporting body 7 itself, a fastening arrangement 17 is provided for mounting a brake block shoe (not shown), according to the UIC Standard. As an alternative, a linking device 19 can be provided for conventional operating arrangements of block brake units (not shown), according to the UIC Standard.

Figure 1C:
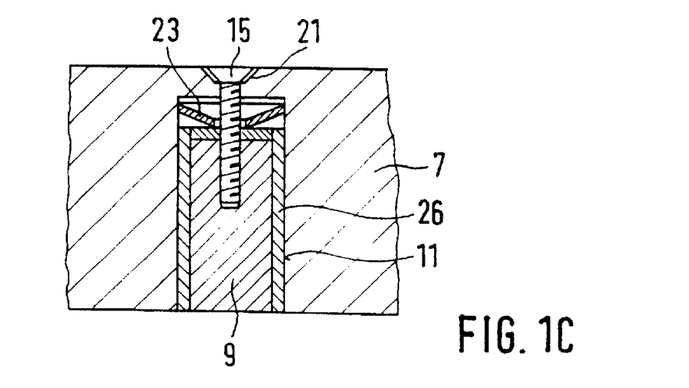
FIG. 1C is a detailed view of the recess illustrated in FIG. 1B.
Figure 2A:
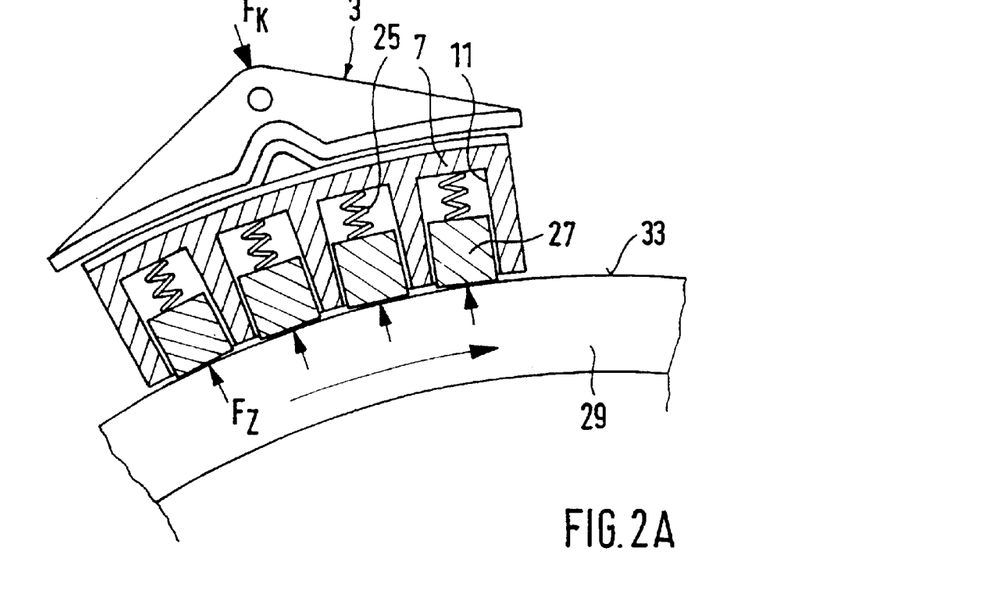
FIG. 2A is a cross-sectional view of another embodiment of a braking body according to the invention resting against a wheel running surface.
Figure 2B:
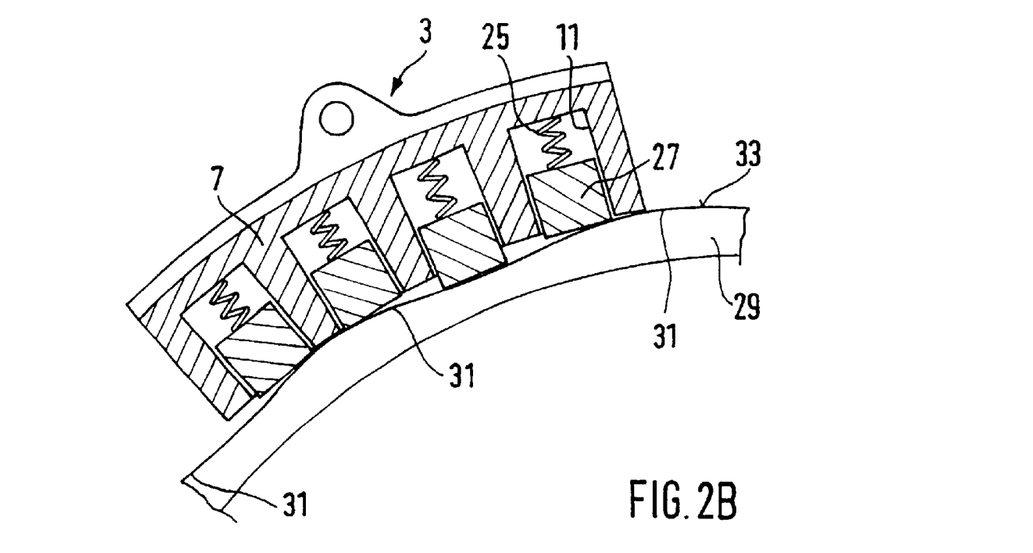
FIG. 2B is a cross-sectional view of the braking body according to the invention resting against a wheel running surface having bulges.

In FIG. 1C, a recess 11 in the supporting body 7 is constructed as a pocket hole. The cylindrical friction material element 9 is held, for example, by the fastening device 15 shown as a screw, with the screw head being sunk in a depression 21 provided in the supporting body 7. A cup spring 23 is provided as the elastic element 13. As an alternative for instance, a flat coil spring, a rubber ring or a small rubber plate or rubber mat can be used. A sleeve 26 is located around the friction material element 9. The sleeve 26 may be made of sheet metal or equivalent material. The embodiment shown at FIGS. 2A and 2B illustrate a method of operation of the invention. FIG. 2a shows a constant braking with a high application force.

The braking body 3 comprises a supporting body 7 as well as friction material elements 27 elastically disposed by springs 25 in the recesses 11. Because the supporting body 7 is constructed of a softer material than the friction material elements 27, this supporting body 7 will wear down faster than the friction material elements 27. The friction material elements 27 will then compress so far that the sum of the forces $F_Z$ absorbed by the friction material elements 27 from the direction of the running surface 33 of the wheel 29 corresponds approximately to the application force $F_K$ of the braking body 3.

After the occurrence of a contact pattern change, as illustrated in FIG. 2B, for example, as a result of thermally caused bulges 31 in the running surface 33 of the wheel 29, a compression or rebounding of the friction material elements 27 will take place corresponding to the characteristic curve of the spring 25, while each wheel bulge 31 wears out the supporting body 7 more than the adjacent cylindrical friction material element 27.

Figure 3A:
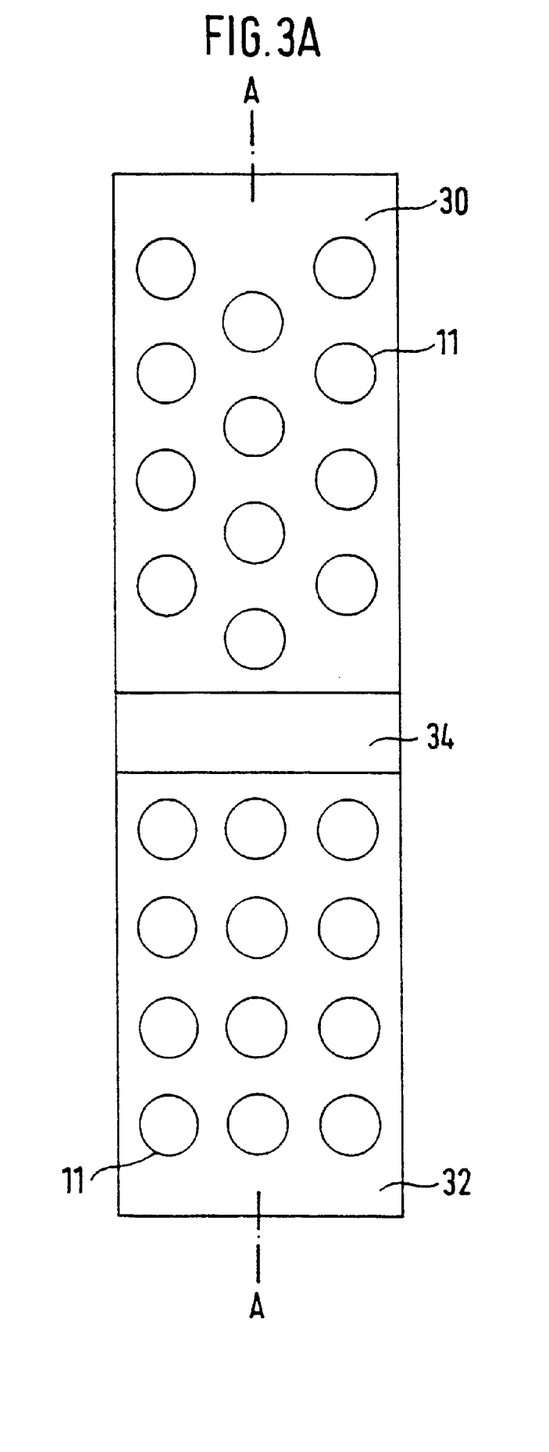
FIG. 3A is a top view of a two-part embodiment of a braking body according to the invention.
Figure 3B:
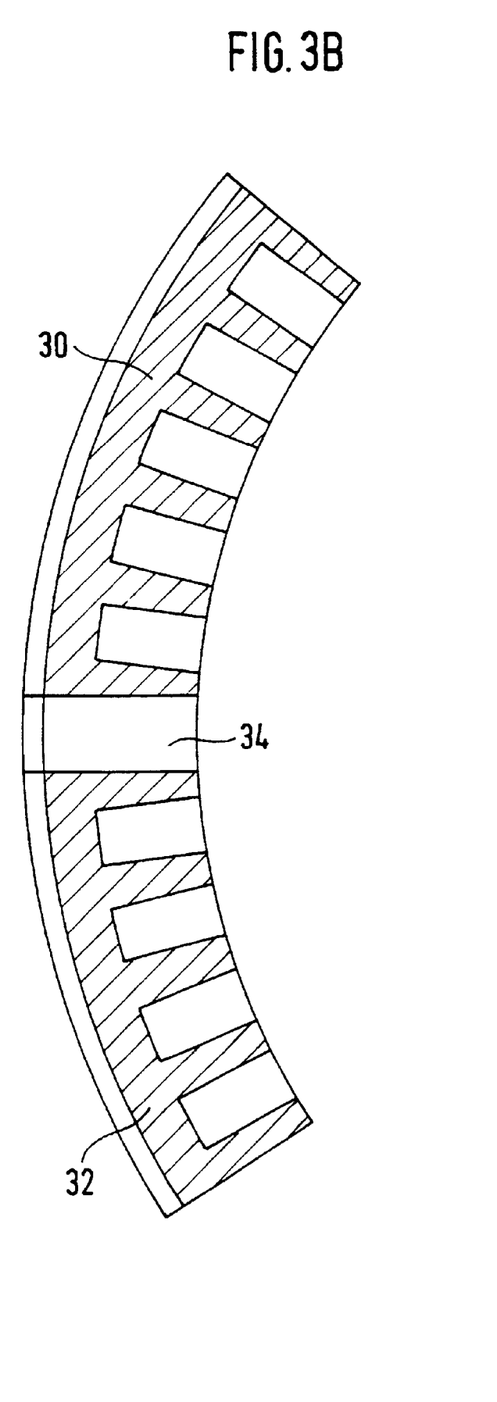
FIG. 3B is a cross-sectional view along Line A—A of the braking body illustrated in FIG. 3A.

FIGS. 3A and 3B illustrate a two-part embodiment of the braking body 3. The two part embodiment comprises two sections 30, 32 which are separated from one another by a separating area 34. In section 30, the recesses 11 are arranged offset with respect to one another, while the recesses 11 in section 32 are arranged in series.

Figure 4A:
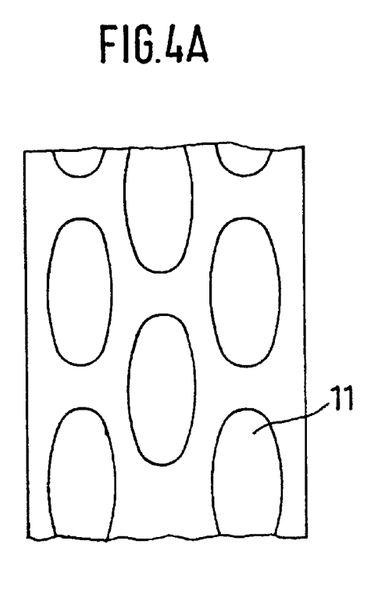
FIG. 4A is a top view of a brake block according to the invention with elliptical recesses.
Figure 4B:
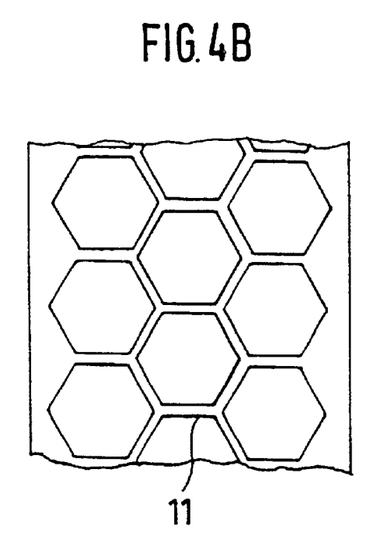
FIG. 4B is a top view of a brake block according to the invention with a hexagonal recess.

FIGS. 4A and 4B show additional embodiments of recesses 11 with different shapes. In FIG. 4A, the recesses have an elliptical shape. In FIG. 4B, they have an n-cornered shape shown for example as a hexagonal.

While in the embodiments of FIGS. 1 to 4, each friction material element 9, 27 forms an individual or singular friction material block, FIGS. 5A to 5E show embodiments of the invention in which a plurality of friction material elements are combined to form frictional material blocks 40.1, 40.2, 40.3.

Figures 5A, 5B:
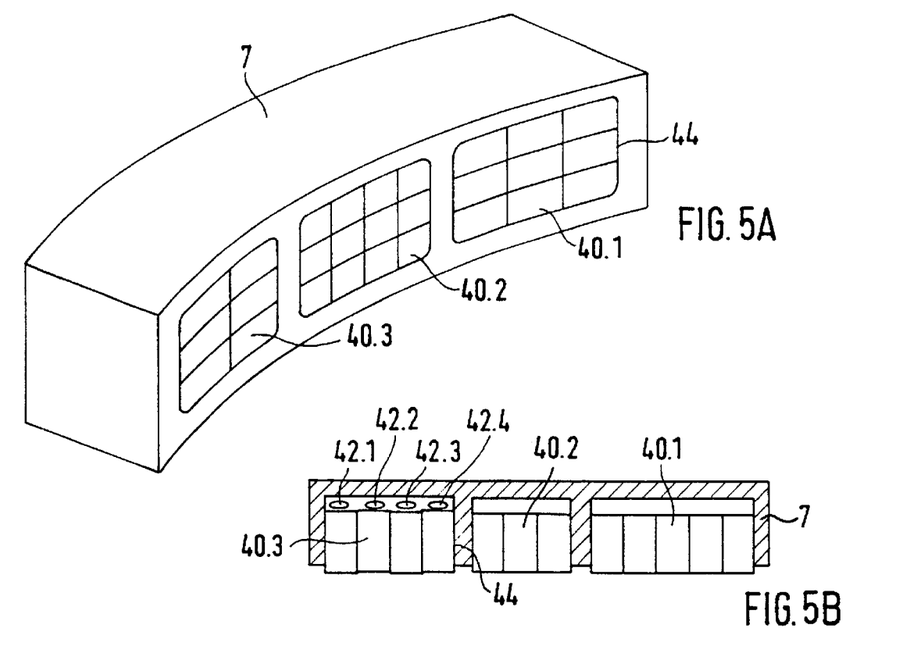
FIG. 5A is a perspective view of a braking body according to the invention with friction material elements combined to friction material blocks.
FIG. 5B is a cross-sectional view of the braking body shown in FIG. 5A.

In FIG. 5A, friction material blocks 40.1, 40.2, 40.3 are placed in the supporting body 7. Each friction material block 40.1, 40.2, 40.3 separately comprises a plurality of individual friction material elements 9, (see FIG. 1B)) 27 (See FIG. 2B) 50 (See FIG. 5E).

As shown in FIG. 5B friction material blocks 40.1, 40.2 and 40.3 are each individually elastically arranged in the recesses 44. The elastic mounting of each friction material block 40.1, 40,2, 40.3 is done by using elastic elements 42.1, 42.2, 42.3, 42.4, which are only schematically outlined here.

Figure 5C:
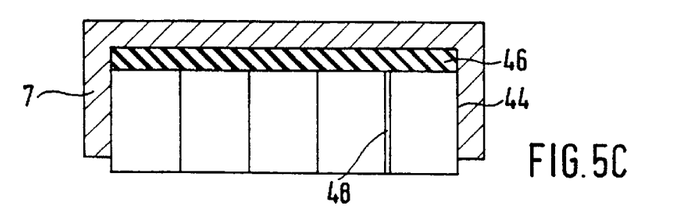
FIG. 5C is a side cross-sectional view of another embodiment of a braking body with a friction material block.
Figure 5D:
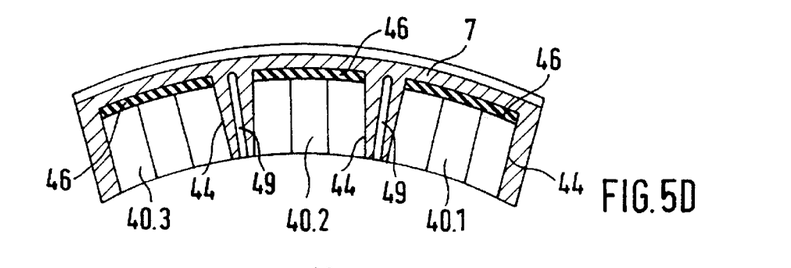
FIG. 5D is a cross-sectional view of another embodiment of the braking body shown in FIG. 5A.
Figure 5E:
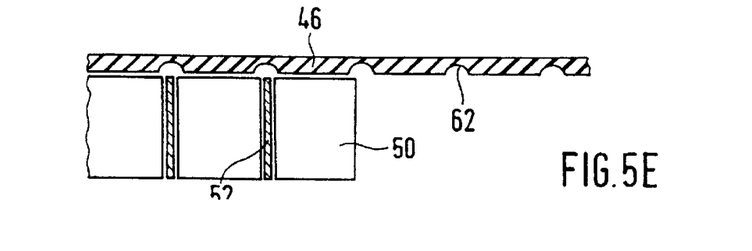
FIG. 5E is a cross-sectional view of another embodiment of the braking body of the invention shown in FIG. 5A.

As illustrated in FIG. 5C, a continuous elastic rubber mat 46 may be used in the recess 44. Instead of individual elastic elements 42.1, 42.2, 42.3, 42.4. Also in order to reduce the coefficient of friction, the individual friction material elements 9, 27, 50 can be provided with sleeves 48 as a casing. FIG. 5D shows an alternative embodiment of a braking body 3 where slots 49 are provided between the recesses 44 for the individual friction material blocks 40.1, 40.2, 40.3 to increase the flexibility of the supporting body 49. The elastic suspension of the individual friction material blocks 40.1, 40,2, 40.3 takes place by using rubber mats 46. As illustrated in FIGS. 5C–5E, the friction material element 50 and/or the friction material blocks 40.1, 40.2, 40.3, on the side facing the running surface 33 of a wheel 29, can close off flush with the supporting body 7.

As illustrated in FIG. 5E, the rubber mats 46 can be provided with recesses 62. For reducing the coefficient of friction, sheet metal supports 52 can be provided between the individual friction material elements 50 of a friction material block 40.1, 40.2, 40,3.

Figure 6A:
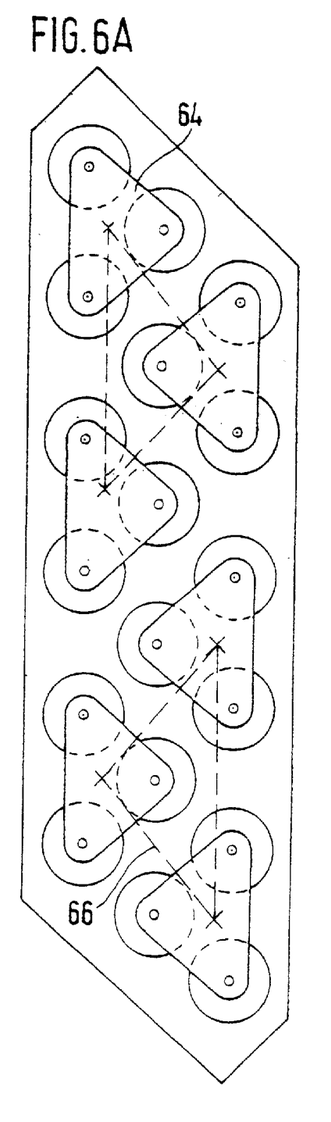
FIG. 6A is a top view of another embodiment of a braking body according to the invention with tilting elements for moving the friction material elements in the direction of the longitudinal axis of the recesses.
Figures 6B, 6C:
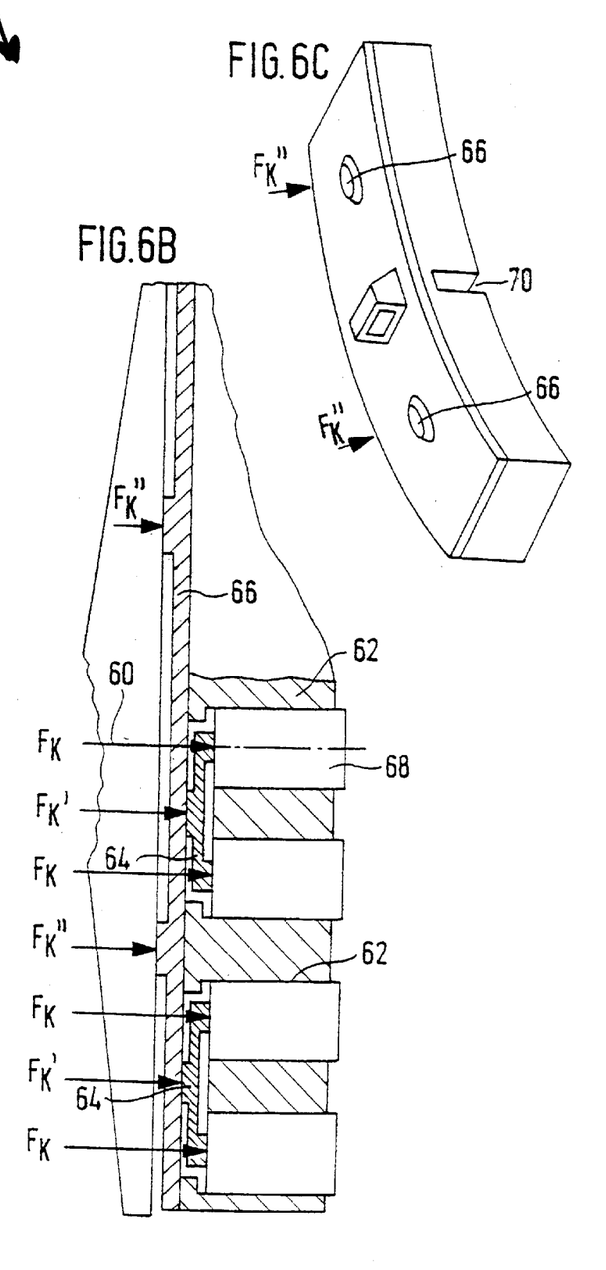
FIG. 6B is a lateral cross-sectional view of the embodiment shown in FIG. 6A.
FIG. 6C is a perspective view of a brake block with a braking body according to the shown in the embodiment of FIG. 6A.

In addition to the above-described embodiments comprising elastic suspension of the friction material elements 9, 27, 50 and/or the friction material blocks 40.1, 40,2, 40,3 by spring elements, other embodiments permit mobility or suspension in the direction of the longitudinal axis 60 of the individual recesses 62 by tilting element 64 as shown in FIGS. 6A–6B. In this preferred embodiment, tilting element 64 is constructed as a tripod-type tilting device. A superset tilting element 66 can comprise up to three of the tilting elements 64. As a result of the tilting, the tilting elements 64, 66 permit a movement in the direction of the longitudinal axis 60 which is an analogous movement to that of the elastically suspended individual friction material elements 68.

In the individual recesses 62, the friction material elements 68 are prevented from falling out, for example by projections which are not shown.

The braking body 3 shown in FIGS. 6A–6C, comprises two superset tripod-type tilting devices 66 to which, in turn, three tripod-type tilting devices 64 with three friction material elements 68 respectively are assigned. The area of each superset tripod-type tilting device 66 is separated by a slot 70. The distribution of the individual application forces $F_K$, $F_{K'}$, $F_{R''}$ are also shown.

Figure 7A:
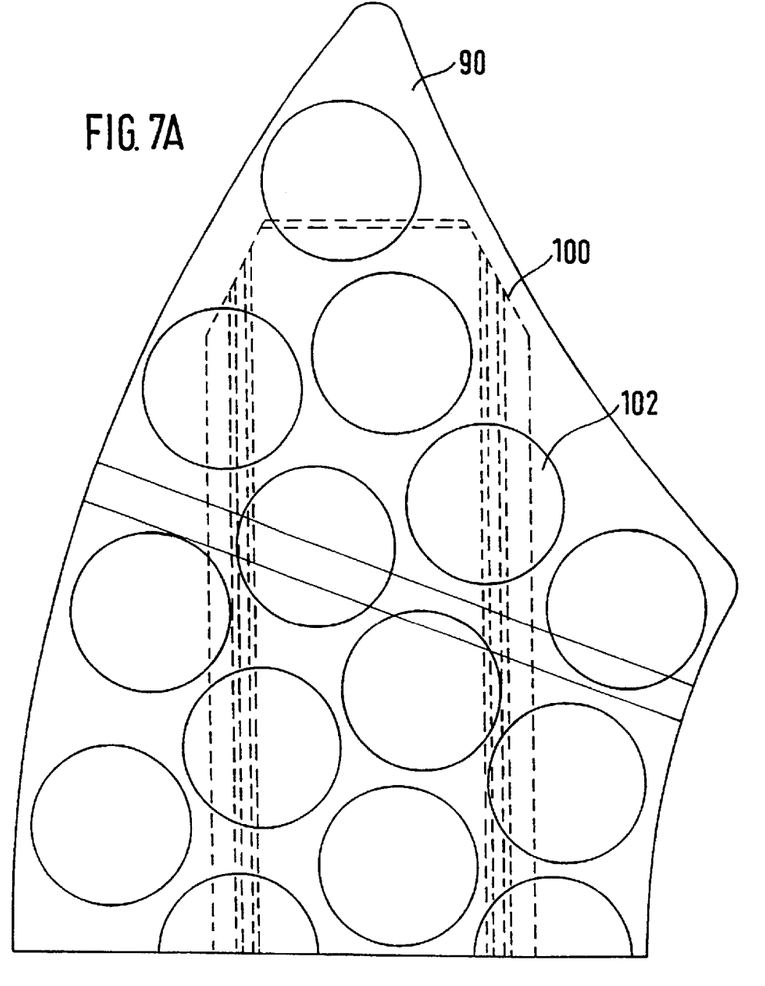
FIG. 7A is a top view of another embodiment of a braking body according to the invention for use in disk brakes.
Figure 7B:
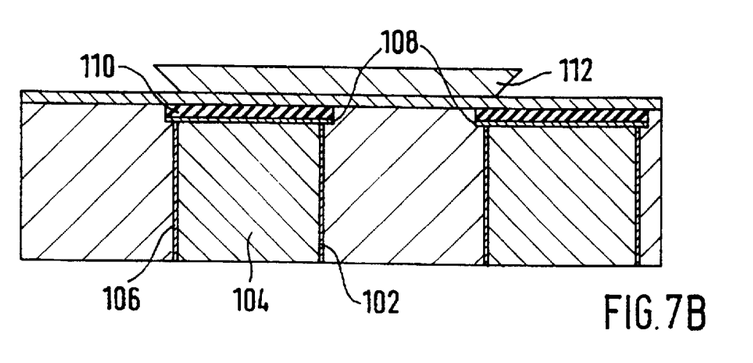
FIG. 7B is a cross-sectional view of the braking body shown in FIG. 7A.

FIGS. 7A and 7B show an embodiment of the braking body 3 as a disk pad 90. The disk pad 90 comprises a supporting body 100, which preferably has a disk shape, with recesses 102 provided therein. Friction material elements 104 are provided in the individual recesses 102. For reducing the friction, for example, a sleeve 106 made of sheet metal is provided between a friction material element 104 and a recess 102 constructed as a hole. Cylindrical friction material elements 104 are prevented from falling out of the recesses 102 by means of small plates 108, to which they are fixedly connected. Rubber elements are used as elastic spring elements 110. In the present, embodiment the supporting body 100 is constructed as a supporting plate which comprises a dovetail guide 112 for an easy fastening and exchangeability on the brake support (not shown). In this embodiment, the recesses 102 are designed as cylindrical depressions in the plate-shaped supporting body 100. The percentage of the friction surface of the cylindrical friction material elements 102 is at least 50% of the entire friction surface of the brake pad. The sleeve 106 for reducing the coefficient of friction has a wall thickness of less than 1 mm. In a slotted embodiment of the sleeve 106, tolerances can easily be maintained. A sleeve 106 mounted under prestress permits a simple assembly of the braking body 3. In addition to reducing the friction between the cylindrical friction material body 104 and the supporting body 100, the sleeves 106 also have the purpose of deflecting water when the brake disks are acted upon by wetness.

The braking body of the present invention, whether a brake block or a disk brake pad are distinguished by an excellent contact pattern because the block or pad surface adapts itself to the uneven friction surface of the brake disk or the wheel. Furthermore, because of the elastic mounting and the friction of the friction material elements, the brake disks and brake blocks are noise muffling.

Furthermore, the embodiments of the braking body permits the use of hard, wear-resistant friction materials while maintaining a good contact pattern. In comparison with free-standingly sprung braking bodies, the embodiments of the present invention have the advantage that the friction material elements are introduced into the supporting body and are supported on the recesses. This prevents bending deformations because of tangential friction forces. In addition, the wear is planar, irrespective of the traveling direction. Another advantage is avoidance of hot spots and rail corrugation.

Furthermore, the braking body embodiments of the present invention can be produced at reasonable cost. Thus, the supporting body can be pressed, and, if they are circular-cylindrical elements, the friction material elements can be produced from pressed rods.

The conventional linking of the brake pads according to the invention, for example, by dovetail guides, permits an easy exchangeability with UIC components.

What is claimed is:

1. A braking body, which is constructed as a brake block or a disk brake pad, comprising:
    a supporting body having recesses;
    friction material elements movably disposed in the recesses in the direction along the recesses;
    tilting elements mounting the friction material elements which permit a movement of the friction material elements in the direction of the longitudinal direction of the recesses as a result of tilting movements of the tilting elements;
    friction material blocks formed from the friction material elements; and
    the friction material blocks form a friction surface together with the supporting body.

2. The braking body according to claim 1, wherein the recesses are arranged with the friction material elements in series with respect to one another.

3. The braking body according to claim 1, wherein the recesses are arranged with the friction material elements offset with respect to one another.

4. The braking body according to claim 1, wherein the percentage of the friction surface of the friction material elements is at least 30% of the entire surface of the braking body.

5. The braking body according to claim 4, wherein the percentage is preferably 50–80%.

6. The braking body according to claim 1, wherein a plurality of tilting elements are arranged above one another and coupled to one another to form a superset tilting element.

7. The braking body according to claim 1, includes devices for reducing friction in the recesses between a wall of the recess and the friction material elements.

8. The braking body according to claim 7, wherein the devices for reducing friction are sleeves.

9. The braking body according to claim 1, wherein the supporting body comprises a softer and more wear-prone material than the material of the friction material elements.

10. The braking body according to claim 1, wherein the friction material elements comprise a hard, wear-resistant friction material with a high modulus of elasticity.

11. The braking body according to claim 10, wherein the friction material is a sintered material.

12. The braking body according to claim 1, wherein the friction material elements in combination in a recess are combined to form a friction material block.

13. The braking body according to claim 1, wherein the friction material elements have a circular-cylindrical shape.

14. The braking body according to claim 1, wherein the friction material elements have a polygonal or elliptical shape.

\* \* \* \* \*